United States Patent
Saitoh

[11] Patent Number: 5,929,414
[45] Date of Patent: Jul. 27, 1999

[54] CONTACT/NON-CONTACT IC CARD AND CONTACT/NON-CONTACT IC CARD READER-WRITER

[75] Inventor: Masataka Saitoh, Tokyo, Japan

[73] Assignee: Oki Electric Industry Co., Ltd., Tokyo, Japan

[21] Appl. No.: 08/816,521

[22] Filed: Mar. 13, 1997

[30] Foreign Application Priority Data

Mar. 14, 1996 [JP] Japan ................................. 8-057127
Dec. 4, 1996 [JP] Japan ................................. 8-323936

[51] Int. Cl.$^6$ ........................................ G06K 5/00
[52] U.S. Cl. ..................... 235/380; 235/441; 235/492
[58] Field of Search ............................. 235/380, 382, 235/382.5, 436, 439, 441, 492

[56] References Cited

U.S. PATENT DOCUMENTS

| | | | |
|---|---|---|---|
| 4,724,427 | 2/1988 | Carroll | 340/572 |
| 5,157,247 | 10/1992 | Takahira | 235/492 |
| 5,218,343 | 6/1993 | Stobbe et al. | 340/572 |
| 5,471,203 | 11/1995 | Sasaki et al. | 235/382 |
| 5,619,529 | 4/1997 | Fujioka | 235/380 |
| 5,671,254 | 9/1997 | Nagata et al. | 375/326 |

*Primary Examiner*—Michael G. Lee
*Assistant Examiner*—Diane I. Lee
*Attorney, Agent, or Firm*—Rabin & Champagne, P.C.

[57] ABSTRACT

An IC card capable of being operated with both a contact IC card reader-writer and a non-contact IC card reader-writer, and an IC card reader-writer capable of operating with both a contact IC card and a non-contact IC card. The IC card includes a contact for connecting to a contact IC card reader-writer, a transceiver for communicating with a non-contact IC card reader-writer, a modem for use with a non-contact IC card reader-writer, a CPU for controlling data communication, a detector for detecting whether the IC card is inserted in a contact IC card reader-writer or a non-contact IC card reader-writer, and a selector. The selector connects the contact with the CPU if the detector determines that the IC card is inserted in a contact IC card reader-writer, and connects the modem and the CPU if the detector determines that the contact/non-contact IC card is inserted in a non-contact IC card reader-writer. The reader-writer includes a contact for communicating with a contact IC card, a transceiver for communicating with a non-contact IC card, a modem used with a non-contact IC card, and a CPU. The CPU determines the type of inserted IC card and the reader-writer accesses the card accordingly.

9 Claims, 12 Drawing Sheets

CONTACT/NON-CONTACT IC CARD AND CONTACT/NON-CONTACT IC CARD READER-WRITER

BACKGROUND OF THE INVENTION

1. Field of the Invention

The present invention relates to a contact/non-contact integrated circuit (IC) card and a contact/non-contact IC card reader-writer. As used hereinafter, the phrase "contact/non-contact IC card" means an IC card that can be operated with both a contact IC card reader-writer and non-contact card reader-writer, and the phrase "contact/non-contact IC card reader-writer" means an IC card reader-writer that can be operated with both a contact IC card and a non-contact IC card.

2. Description of the Related Art

Conventionally, a contact IC card interfaces with a IC card reader-writer via a contact on each, and the reader writer is operated so as to read and write the data of the contact IC card.

Figure 2:
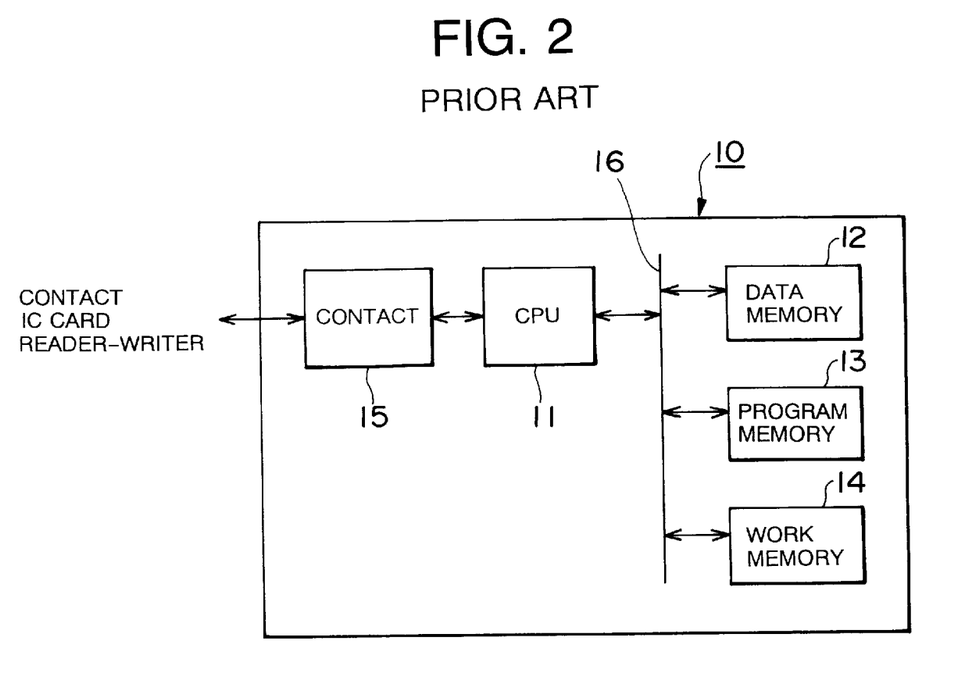
FIG. 2 is a structural view of a conventional contact IC card.
Figure 3:
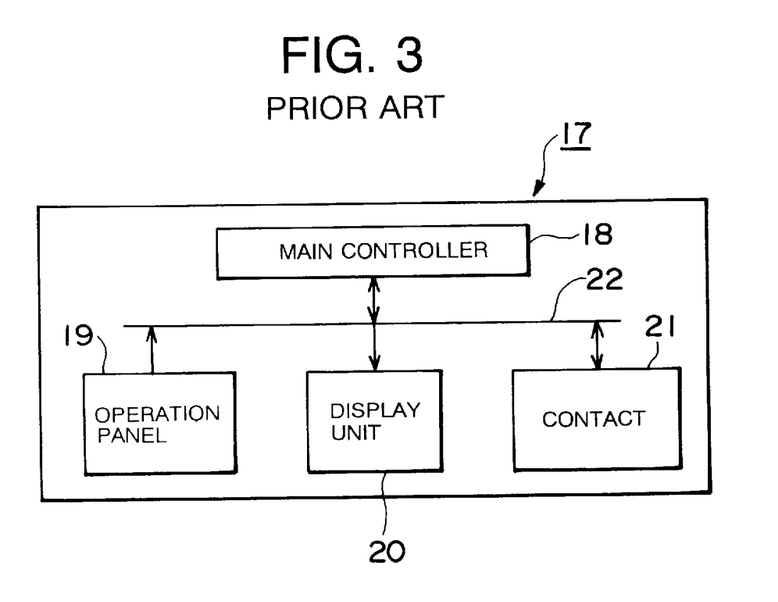
FIG. 3 is a structural view of a conventional contact IC card reader-writer.

FIG. 2 is a structural view of a conventional contact IC card, and FIG. 3 is a structural view of a conventional contact IC card reader-writer.

In FIGS. 2 and 3, reference numeral 10 designates a contact IC card, provided with a contact 15 for communicating with a contact IC card reader-writer 17, a data memory 12 (for which an EEPROM (electrically erasable and programmable read only memory) is generally used) to be accessed from the contact IC card reader-writer 17, a CPU for performing the data communication process with the contact IC card reader-writer 17, the management of access to the data memory 12, and the like, a program memory (for which a mask ROM (read only memory) is generally used) that stores programs performed by the CPU 11, and a work memory 14 (for which a RAM (random access memory) is generally used), including a transmission-reception buffer or the like which is necessary for the CPU 11 to perform various processes. The CPU 11, the data memory 12, the program memory 13 and the work memory 14 are connected to one another through a data bus 16.

The contact IC card reader-writer 17 is provided with a contact 21 for communicating with the contact IC card 10, an operation panel 19 for inputting operation instructions, a display unit 20 for displaying operation input guidance, operation results and the like, and a main controller 18 for controlling the operation panel 19, the display unit 20 and the contact 21. The main controller 18, the operation panel 19, the display unit 20 and the contact 21 are connected to one another through a data bus 22.

However, with the conventional contact IC card and the conventional contact IC card reader-writer, the contact 15 of the contact IC card 10 is exposed. Therefore, a chip can be damaged by static electricity through the contact 15 and imperfect contact may occur by abrasion, dust, condensation and the like at the contact 15 or the contact 21.

Figure 4:
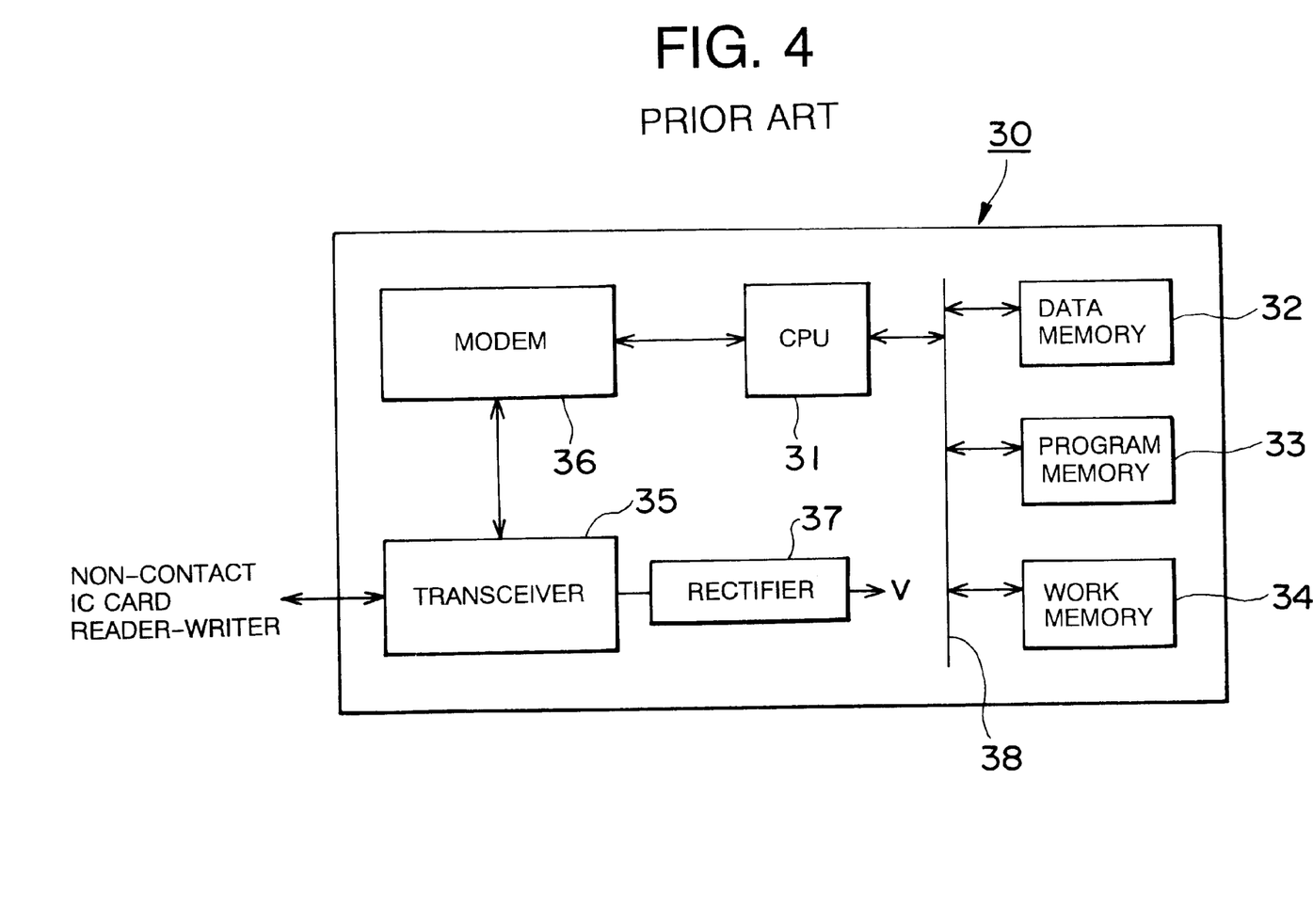
FIG. 4 is a structural view of a conventional non-contact IC card.
Figure 5:
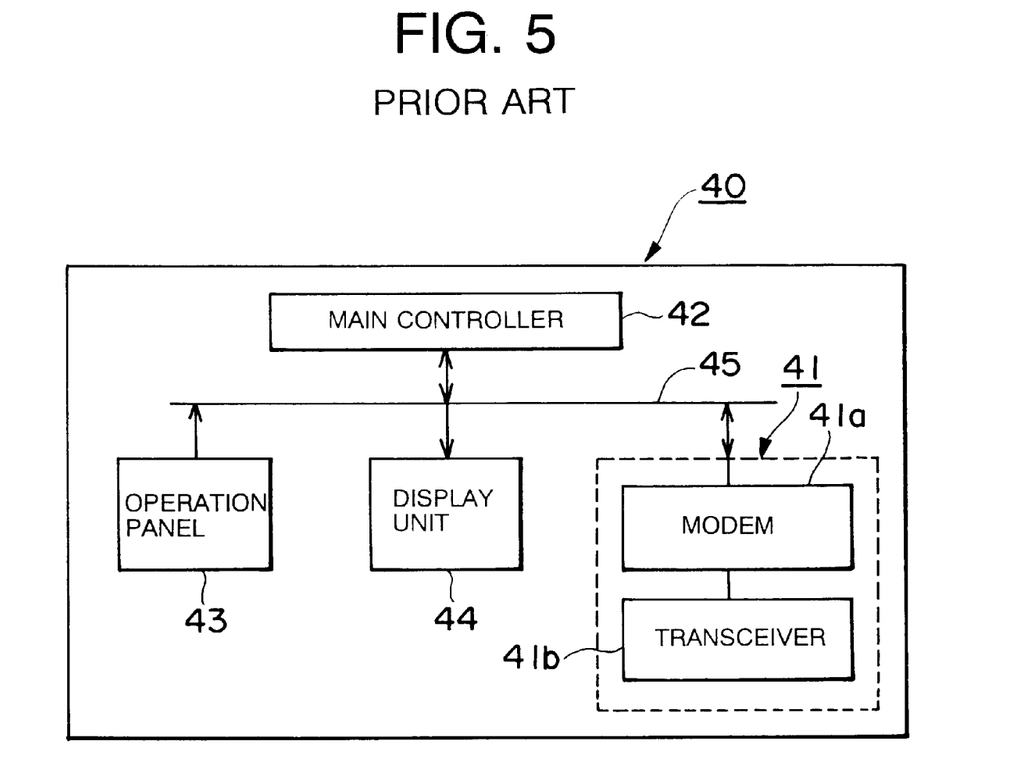
FIG. 5 is a structural view of a conventional non-contact IC card reader-writer.

To overcome this problem, as shown in FIGS. 4 and 5, a non-contact system has been provided with which there is no possibility that the chip may be damaged by static electricity and imperfect contact.

FIG. 4 is a structural view of a conventional non-contact IC card, and FIG. 5 is a structural view of a conventional non-contact IC card reader-writer.

In FIGS. 4 and 5, reference numeral 30 designates an electromagnetic coupling type or electromagnetic induction type non-contact IC card provided with a transceiver (transmitter/receiver) 35 for communicating with a non-contact IC card reader-writer 40, a modem (modulator/demodulator) 36 for modulating the data transmitted to the non-contact IC card reader-writer 40 and demodulating the data received from the non-contact IC card reader-writer 40, a rectifier 37 for taking the supply voltage out from the non-contact IC card reader-writer 40 and producing a predetermined power voltage V, a data bus 38, a data memory 32 to be accessed from the non-contact IC card reader-writer 40, a CPU 31 for performing the communication process with the non-contact IC card reader-writer 40, the management of access to the data memory 32, and the like, a program memory 33 that stores programs performed by the CPU 31, and a work memory 34, including a transmission-reception buffer or the like, which is necessary for the CPU 31 to perform various processes.

The non-contact IC card reader-writer 40 is provided with a wireless part 41, an operation panel 43 for inputting operation instructions, a display unit 44 for displaying operation input guidance, operation results and the like, and a main controller 42 for controlling the wireless part 41, the operation panel 43 and the display unit 44. The wireless part 41, the main controller 42, the operation panel 43 and the display unit 44 are connected to one another through a data bus 45. The wireless part 41 has a modem 41a for modulating the data transmitted to the non-contact IC card 30 or non-contact IC card reader- writer to use the new system.

Now when the current system using the contact IC card 10 (see FIG. 2) is replaced by a new system using the non-contact IC card 30, it is impossible for users who do not have the non-contact IC card 30 to use the new system.

SUMMARY OF THE INVENTION

Accordingly, it is an object of the present invention to provide an IC card which can be operated with both the contact IC card reader-writer and the non-contact IC card reader-writer (contact/non-contact IC card). It is another object of the present invention to provide an IC card reader-writer with which both the contact IC card and the non-contact card can be used (contact/non-contact IC card reader-writer).

A contact/non-contact IC card according to the present invention is provided with a contact for communicating with a contact IC card reader-writer, a transceiver for communicating with a non-contact IC card reader-writer, a modem for use with the non-contact IC card reader-writer, a CPU, a detector for detecting whether a reader writer into which the IC card is inserted, is a contact IC card reader-writer or a non-contact IC card reader-writer, and a selector for alternatively connecting the contact or the modem with the CPU based on the detected result.

A contact/non-contact IC card reader-writer according to the present invention is provided with a contact for communicating with a contact IC card, a transceiver for communicating with a non-contact IC card, a modem for use with the non-contact IC card, and a main controller.

DETAILED DESCRIPTION OF THE PREFERRED EMBODIMENTS

Preferred embodiments of the present invention will now be described with reference to the accompanying drawings.

Figure 1:
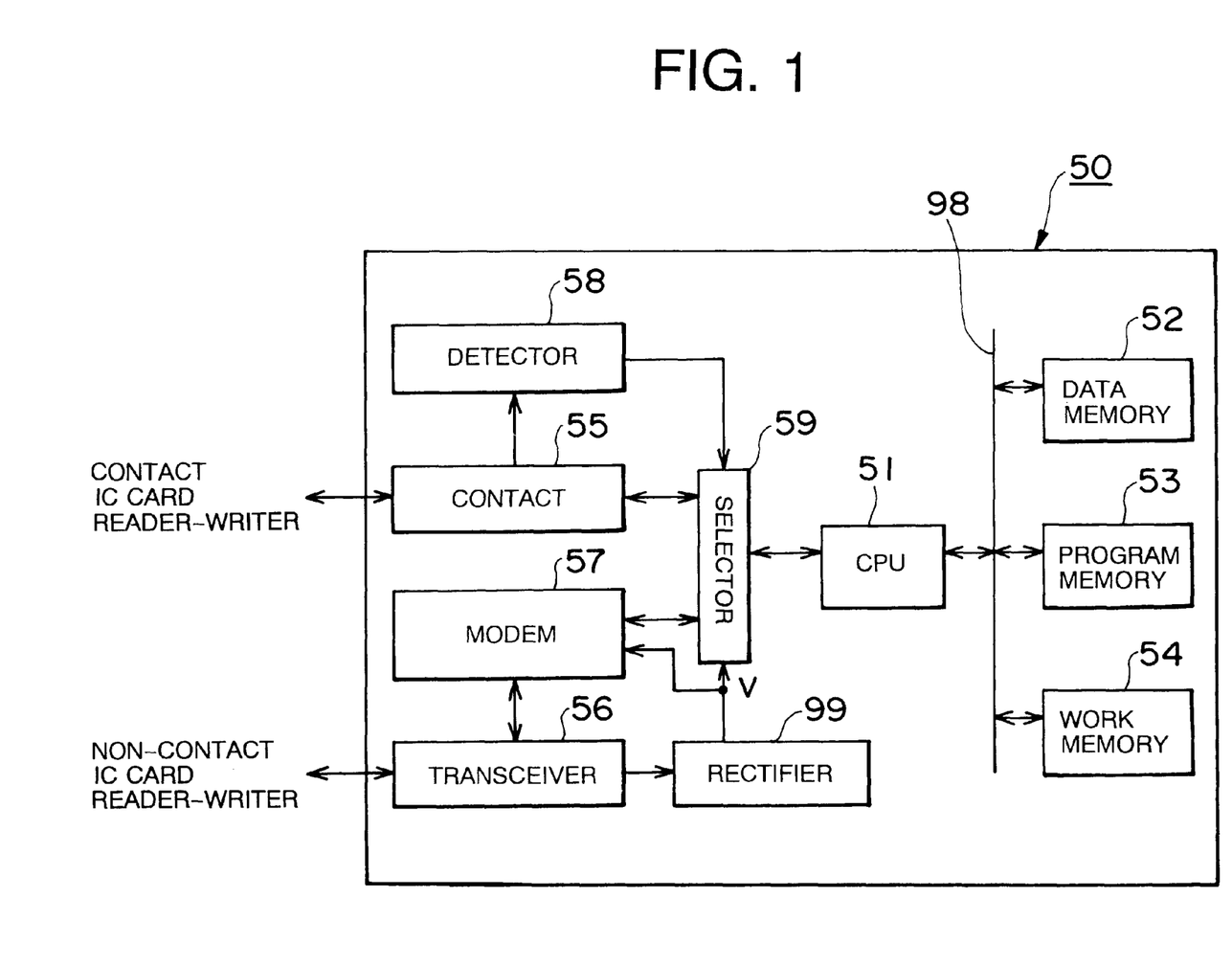
FIG. 1 is a structural view of a contact/non-contact IC card according to the first embodiment of the present invention.

FIG. 1 is a structural view of a contact/non-contact IC card according to the first embodiment of the present invention.

In FIG. 1, reference numeral 50 designates a contact/non-contact IC card having the functions of both the contact IC card 10 (see FIG. 2) and the non-contact IC card 30 (see FIG. 4). The contact/non-contact IC card 50 is provided with a contact 55 for communicating with the contact IC card reader-writer 17 (see FIG. 3), a detector 58, a transceiver 56 provided with a data transmitting/receiving coil (not shown) for communicating with the non-contact IC card reader-writer 40 (see FIG. 5), a rectifier 99 provided with a power coil (not shown) and taking the supply voltage out from the non-contact IC card reader-writer 40 to produce a predetermined power voltage V as a driving voltage, a modem 57 for modulating the data transmitted to the non-contact IC card reader-writer 40 and demodulating the data received from the non-contact IC card reader-writer 40, a selector 59, a data memory 52 (for which an EEPROM as a non-volatile memory is generally used) to be accessed from the contact IC card reader-writer 17 and the non-contact IC card reader-writer 40, a CPU 51 for performing the communication process with the contact IC card reader-writer 17 specified in the ISO 7816-3, the communication process with the non-contact IC card reader-writer 40 specified in the ISO 7816-3, the management of access to the data memory 52 specified in the ISO 7816-3 and the ISO 7816-4 or like, a program memory 53 (for which a mask ROM is generally used) storing programs performed by the CPU 51, a work memory 54 (for which RAM is generally used) including a buffer which is necessary for the CPU 51 to perform various processes, and a data bus 98.

The modem 57 modulates and demodulates data in the AM (amplitude modulation) modulation-demodulation mode, in which a signal varies an amplitude of the carrier wave, the FM (frequency modulation) modulation-demodulation mode in which a signal varies a frequency of a carrier wave, the PM (phase modulation) modulation-demodulation mode in which a signal varies a phase of a carrier wave, the PPM (pulse phase modulation) modulation-demodulation mode in which the position at which a pulse having a predetermined amplitude generated, is shifted in accordance with an amplitude of a signal, the MFM (modified frequency modulation) modulation-demodulation mode in which a pulse is generated with a timing that a digital signal becomes "1", and the like.

The detector 58 determines which of the contact IC card reader-writer 17 and the non-contact IC card reader-writer 40 receives the contact/non-contact IC card 50, based on whether a supply voltage is received from the contact IC card reader-writer 17.

The selector 59 usually operates so as to connect the modem 57 and the CPU 51 and not so as to connect the contact 55 and the CPU 51. Thus, the contact/non-contact IC card 50 is used and the non-contact IC card reader-writer 40 is operated, whereby data can be read from and written to the contact/non-contact IC card 50.

Then, the contact/non-contact IC card 50 is inserted into the contact IC card reader-writer 17, and the activation process specified in the ISO 7816-3 is tried by the contact IC card reader-writer 17. The detector 58 detects that the contact/non-contact IC card 50 is activated, and outputs a detection signal to the selector 59. As a result, the selector 59 operates based on the detection signal so as to connect the contact 55 and the CPU 51, and not so as to connect the modem 57 and the CPU 51. Thus, the contact/non-contact IC card 50 is used and the contact IC card reader-writer 17 is operated, whereby data can be read from and written to the contact/non-contact IC card 50.

Figure 6:
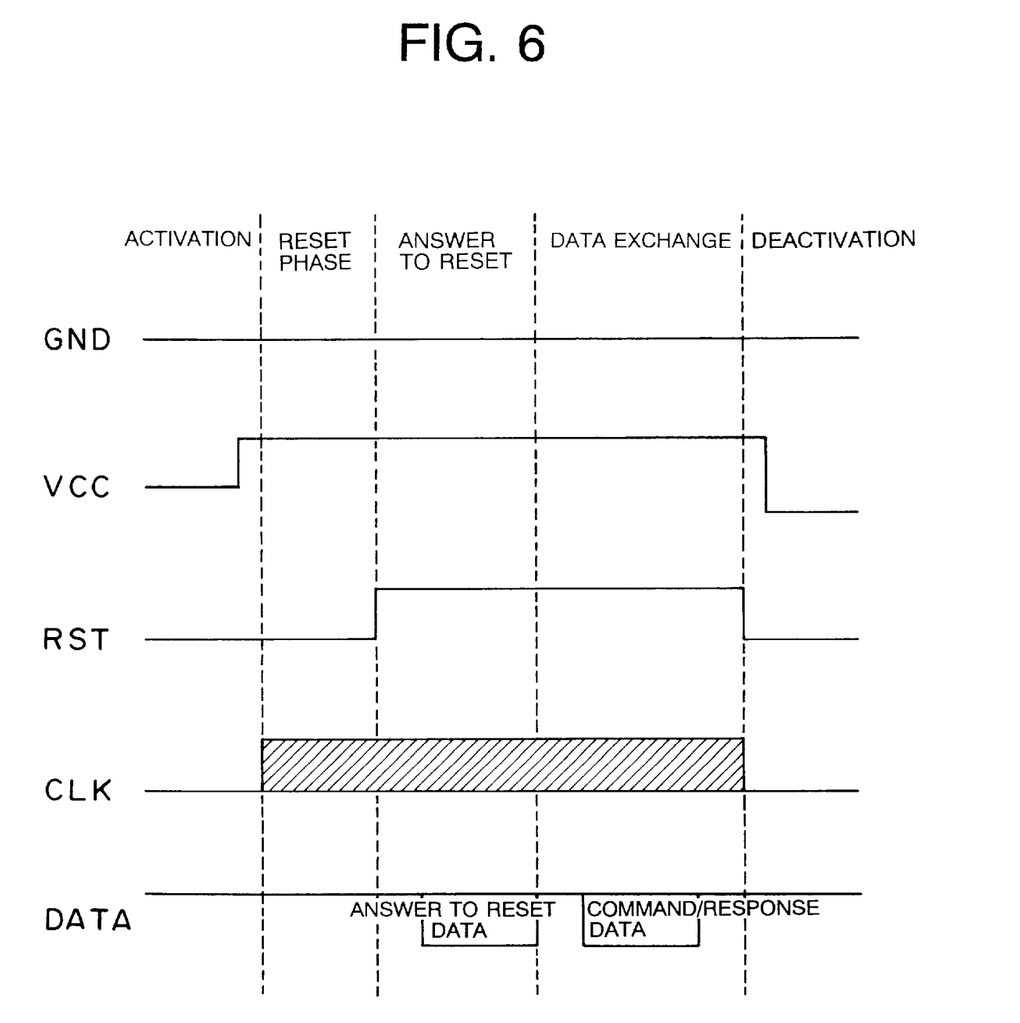
FIG. 6 is a time chart showing an operation of a contact in a contact/non-contact IC card in accordance with the ISO 7816-3 according to the first embodiment of the present invention.
Figure 7:
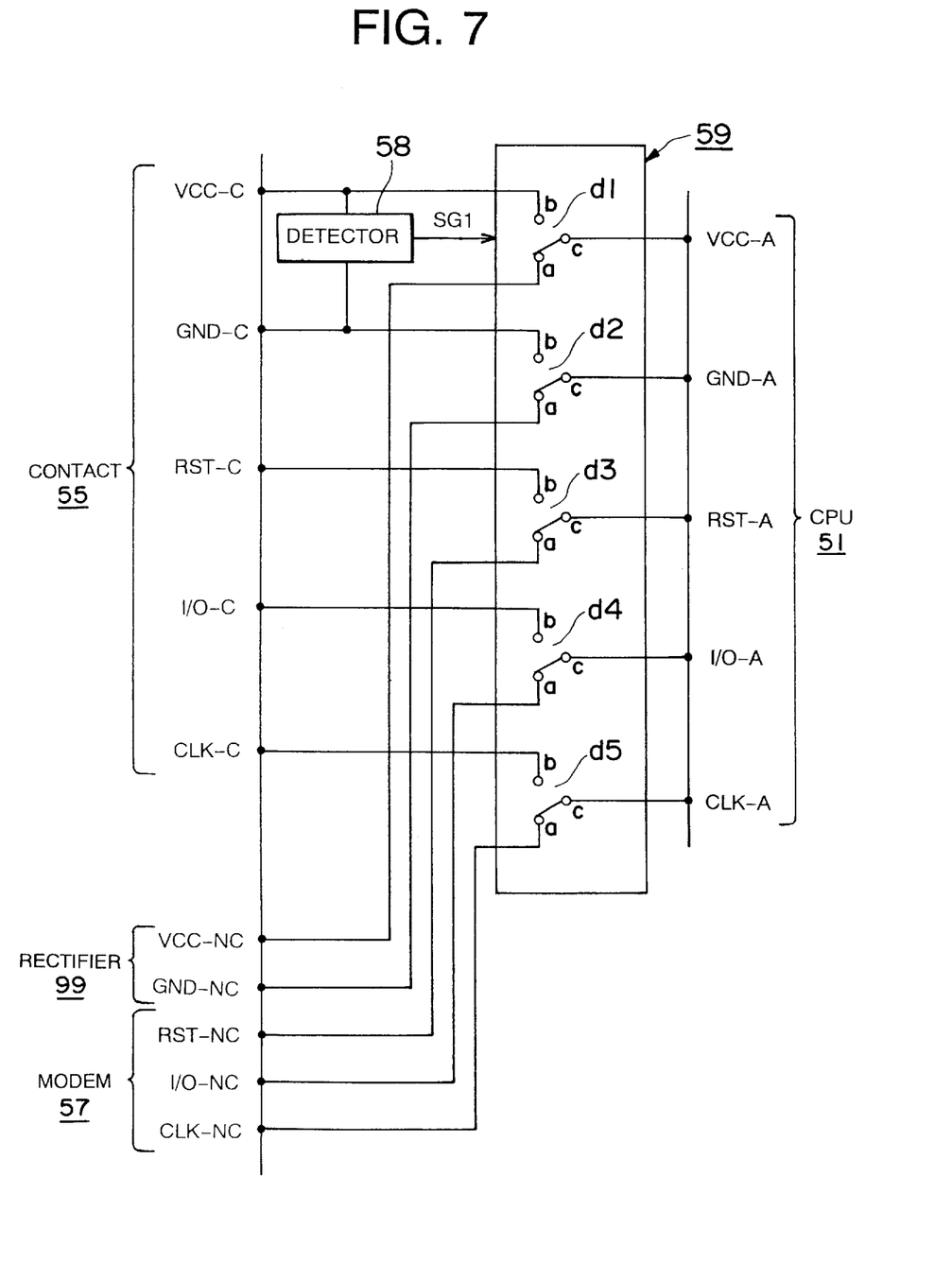
FIG. 7 is a principal circuit diagram of the contact/non-contact IC card according to the first embodiment of the present invention.

FIG. 6 is a time chart showing a process at the contact in the contact/non-contact IC card in accordance with the ISO 7816-3 according to the first embodiment of the present invention, and FIG. 7 is a principal circuit diagram of the contact/non-contact IC card according to the first embodiment of the present invention.

The contact 55 in the contact/non-contact IC card 50 (see FIG. 1) is provided with a grounding contact GND-C set at a reference voltage 0 [V], a supply voltage contact VCC-C to which a supply voltage VCC is applied, a reset signal contact RST-C for receiving a reset signal RST, a clock contact CLK-C for receiving a clock CLK, and a serial data contact for I/O-C transmitting/receiving serial data DATA.

The rectifier 99 in the contact/non-contact IC card 50 is provided with a grounding contact GND-NC and a supply voltage contact VCC-NC to which a supply voltage VCC is applied.

The modem 57 in the contact/non-contact IC card 50 is provided with a reset signal contact RST-NC for receiving a reset signal RST, a clock contact CLK-NC for receiving a clock CLK, and a serial data contact I/O-NC for transmitting/receiving serial data DATA.

The CPU 51 in the contact/non-contact IC card 50 is provided with a grounding contact GND-A, a supply voltage contact VCC-A to which a supply voltage VCC is applied, a reset signal contact RST-A for receiving a reset signal RST, a clock contact CLK-A for receiving a clock CLK, and a serial data contact I/O-A for transmitting/receiving serial data DATA.

The selector 59 in the contact/non-contact IC card 50 is provided with five switching elements d1–d5, and the contacts a of the switching elements d1–d5 are respectively connected with the supply voltage contact VCC-NC and the grounding contact GND-NC in the rectifier 99 and the reset signal contact RST-NC, the serial data contact I/O-NC and the clock contact CLK-NC in the modem 57. The contacts b are respectively connected with the supply voltage contact VCC-C, the grounding contact GND-C, the reset signal contact RST-C, the serial data contact I/O-C and the clock contact CLK-C, in the contact 55. The contacts c are respectively connected with the supply voltage contact VCC-A, the grounding contact GND-A, the reset signal contact RST-A, the serial data contact I/O-A and the clock contact CLK-A, in the CPU 51.

When the contact/non-contact IC card 50 is inserted into the contact IC reader-writer 17 (see FIG. 3), first, the supply voltage VCC is applied to the contact/non-contact IC card 50 by the contact IC card reader-writer 17, the activation for the contact/non-contact IC card 50 is tried, and the transmission of the clock CLK to the contact/non-contact IC card 50 is started.

Then, after starting the transmission of the clock CLK, when the reset phase passes, the reset signal RST becomes ON, the CPU 51 starts to operate and the answer to reset specified in the ISO 7816-3 is performed. In the answer to reset, data is transmitted as an answer to reset data from the contact/non-contact IC card 50 to the contact IC card reader-writer 17.

Thereafter, the exchange of the serial data DATA is performed, and command/response data are transmitted and received between the contact/non-contact IC card 50 and the contact IC card reader-writer 17. Then, when the transmission-reception of the command/response data are finished, the reset signal RST is made OFF and the contact/non-contact IC card 50 is deactivated.

Now, the detector 58 in the contact/non-contact IC card 50 is connected with the supply voltage contact VCC-C and the grounding contact GND-C in the contact 55. Therefore, when the contact/non-contact IC card 50 is inserted into the contact IC card reader-writer 17, the supply voltage VCC supplied from the contact IC card reader-writer 17 is detected. Then, when the detector 58 detects the supply voltage VCC, it outputs the detection signal SG1 to the selector 59.

As a result, the selector 59 selects the switching elements d1–d5 based on the detection signal SG1 from the detector 58 indicating that the detector 58 has detected the supply voltage VCC, and thus the contacts b and the contact c of the switching elements d1–d5 are respectively connected, and the contact 55 and the CPU 51 are connected.

On the contrary, when the contact/non-contact IC card 50 is inserted in the non-contact IC card reader-writer 40 (see FIG. 5), the detector 58 detects no supply voltage VCC. Thus, as the detector 58 detects no supply voltage VCC, the contacts a of the switching elements d1–d5 are respectively connected with the contacts c, and the modem 57 and the rectifier 99 are respectively connected to the CPU 51.

As above described, when the contact/non-contact IC card 50 is used, data can be read from and written to the contact/non-contact IC card 50 not only by operating the contact IC card reader-writer 17 but also by operating the non-contact IC card reader-writer 40.

Thus, it is not necessary to provide both of a contact IC card reader-writer 17 and a non-contact IC card reader-writer 40, and the cost can be reduced.

Next, an explanation will be given of the second embodiment according to the present invention.

Figure 8:
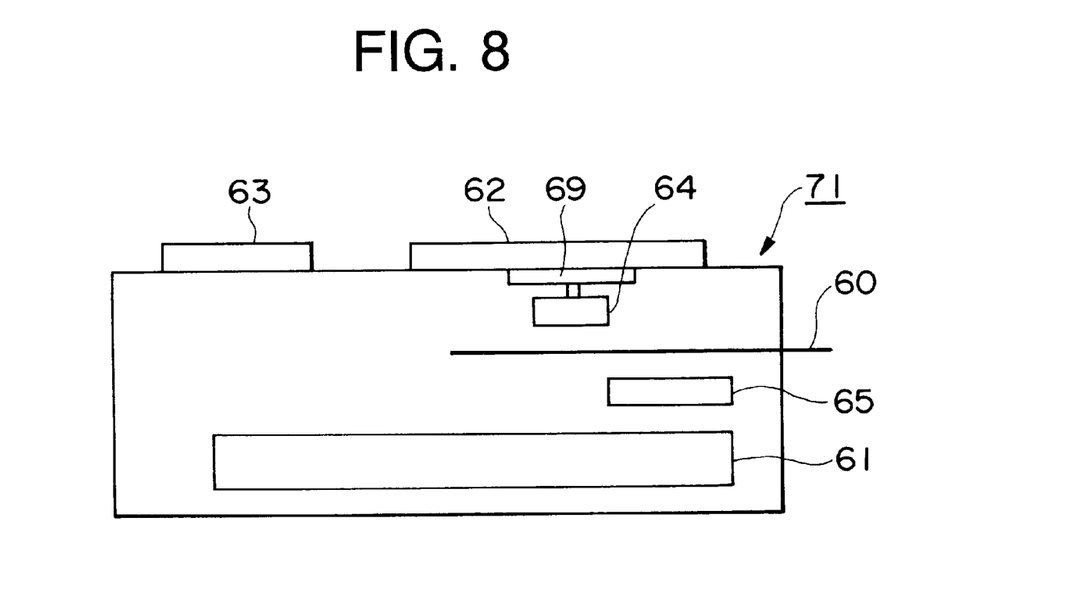
FIG. 8 is a front view of a contact/non-contact IC card reader-writer according to the second embodiment of the present invention.
Figure 9:
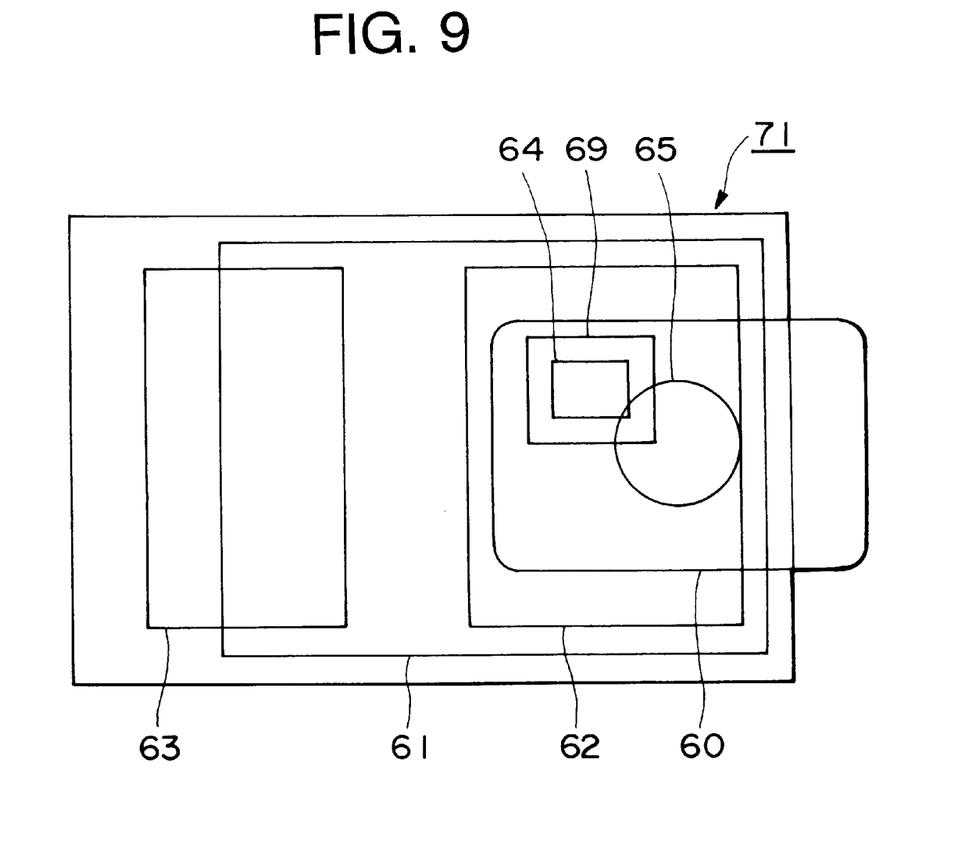
FIG. 9 is a plan view of the contact/non-contact IC card reader-writer according to the second embodiment of present invention.
Figure 10:
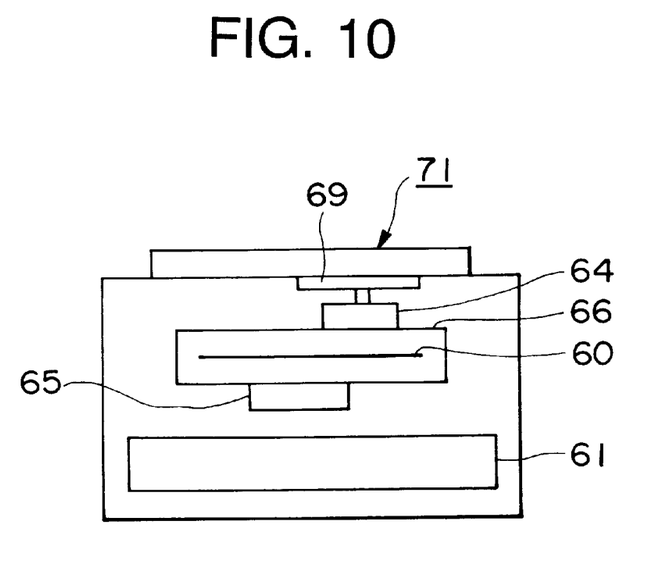
FIG. 10 is a side view of the contact/non-contact IC card reader-writer according to the second embodiment of the present invention.
Figure 11:
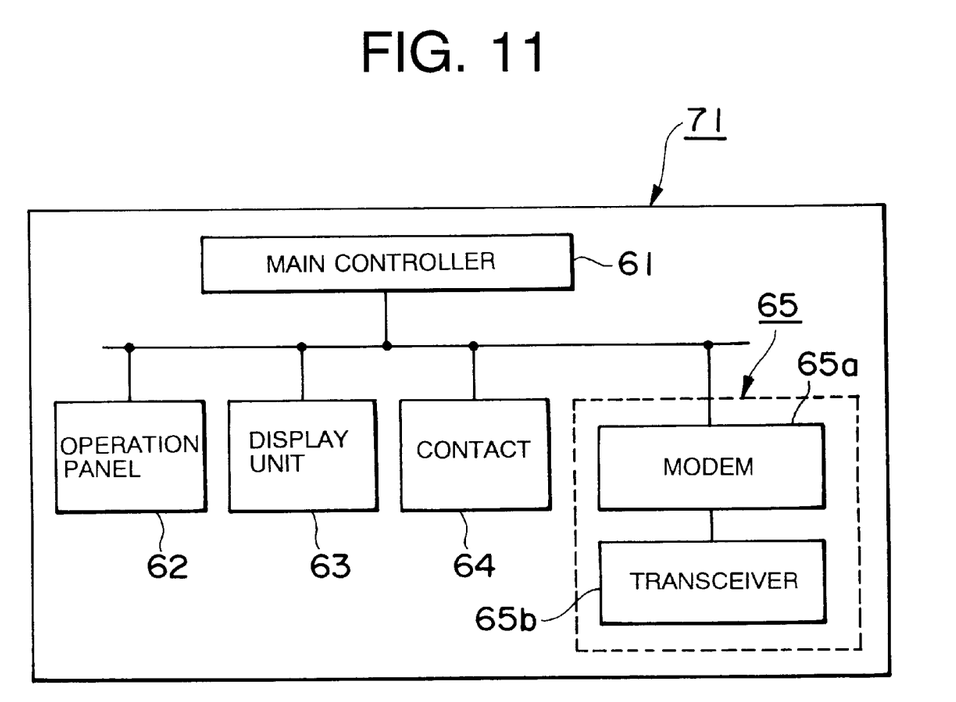
FIG. 11 is a block diagram of the contact/non-contact IC card reader-writer according to the second embodiment of the present invention.

FIG. 8 is a front view of a contact/non-contact IC card reader-writer according to the second embodiment of the present invention. FIG. 9 is a plan view of the contact/non-contact IC card reader-writer according to the second embodiment of the present invention. FIG. 10 is a side view of the contact/non-contact IC card reader-writer according to the second embodiment of the present invention. FIG. 11 is a block diagram of the contact/non-contact IC card reader-writer according to the second embodiment of the present invention.

In FIGS. 8–11, reference numeral 60 designates an IC card which may be any one of the contact IC card 10 (see FIG. 2), the non-contact IC card 30 (see FIG. 4) and the contact/non-contact IC card 50 (see FIG. 1) and reference numeral 71 designates a contact/non-contact IC card reader-writer. The contact/non-contact reader-writer 71 is provided with an IC card insertion port 66 for inserting the IC card 60, a contact 64 arranged to be at the upper side of the IC card 60 upon its insertion, so as to be movable upwardly and downwardly with an actuator 69 for communicating with the contact IC card 10 or the contact/non-contact IC card 50 when contact IC card 10 or the contact/non-contact IC card 50 is used as the IC card 60, a wireless part 65 arranged at the lower side of the carrier path and operating when the non-contact IC card 30 or the contact/non-contact IC card 50 is used as the IC card 60, an operation panel 62 for inputting operation instructions, a display unit 63 for displaying operation guidance, operation results and so on, and a main controller 61 for controlling the operation panel 62, the display unit 63, the contact 64 and the wireless part 65.

The wireless part 65 has a modem 65a for modulating the data transmitted to the non-contact IC card 30 and demodulating the data received data from the non-contact IC card 30, and a transceiver 65b provided with a data transmitting/receiving coil (not shown) for communicating with the non-contact IC card 30.

Next, an explanation will be given of the operation of the above-described contact/non-contact IC card reader-writer 71.

Figure 12:
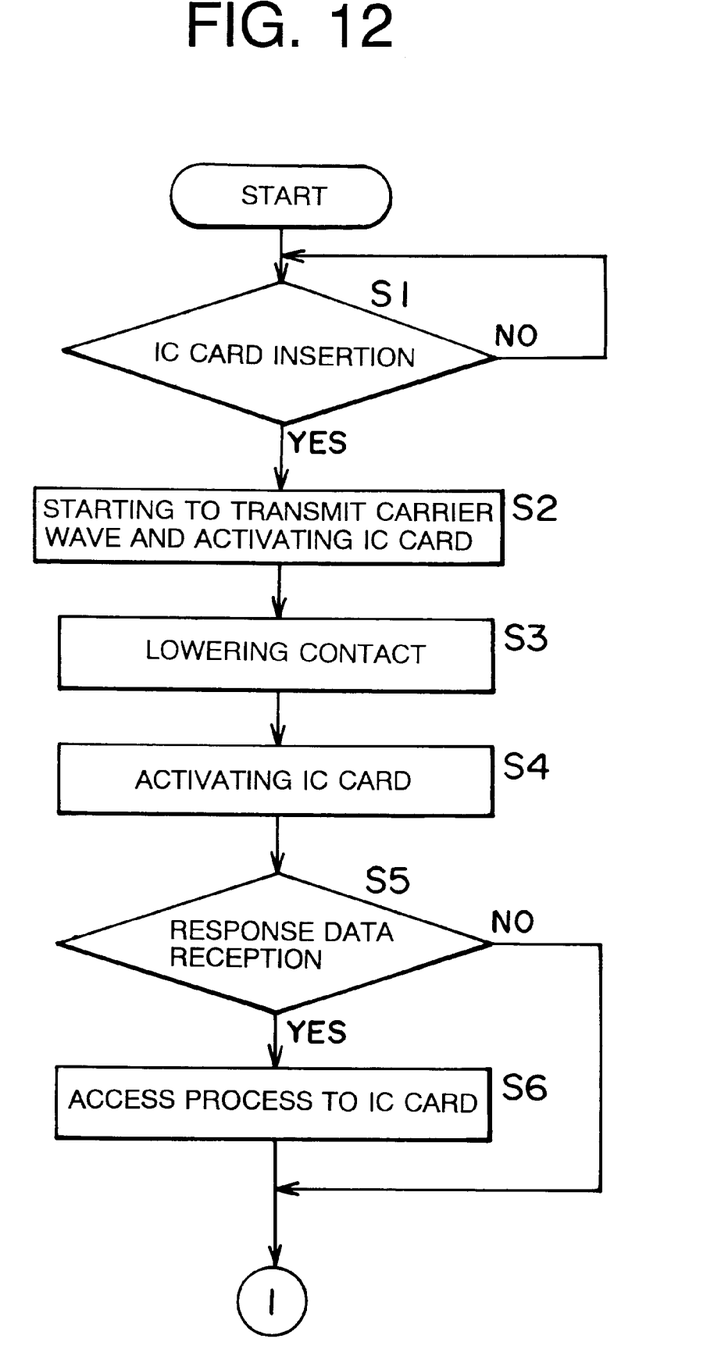
FIG. 12 is a first flow chart showing the operation of the contact/non-contact IC card reader-writer according to the second embodiment of the present invention.
Figure 13:
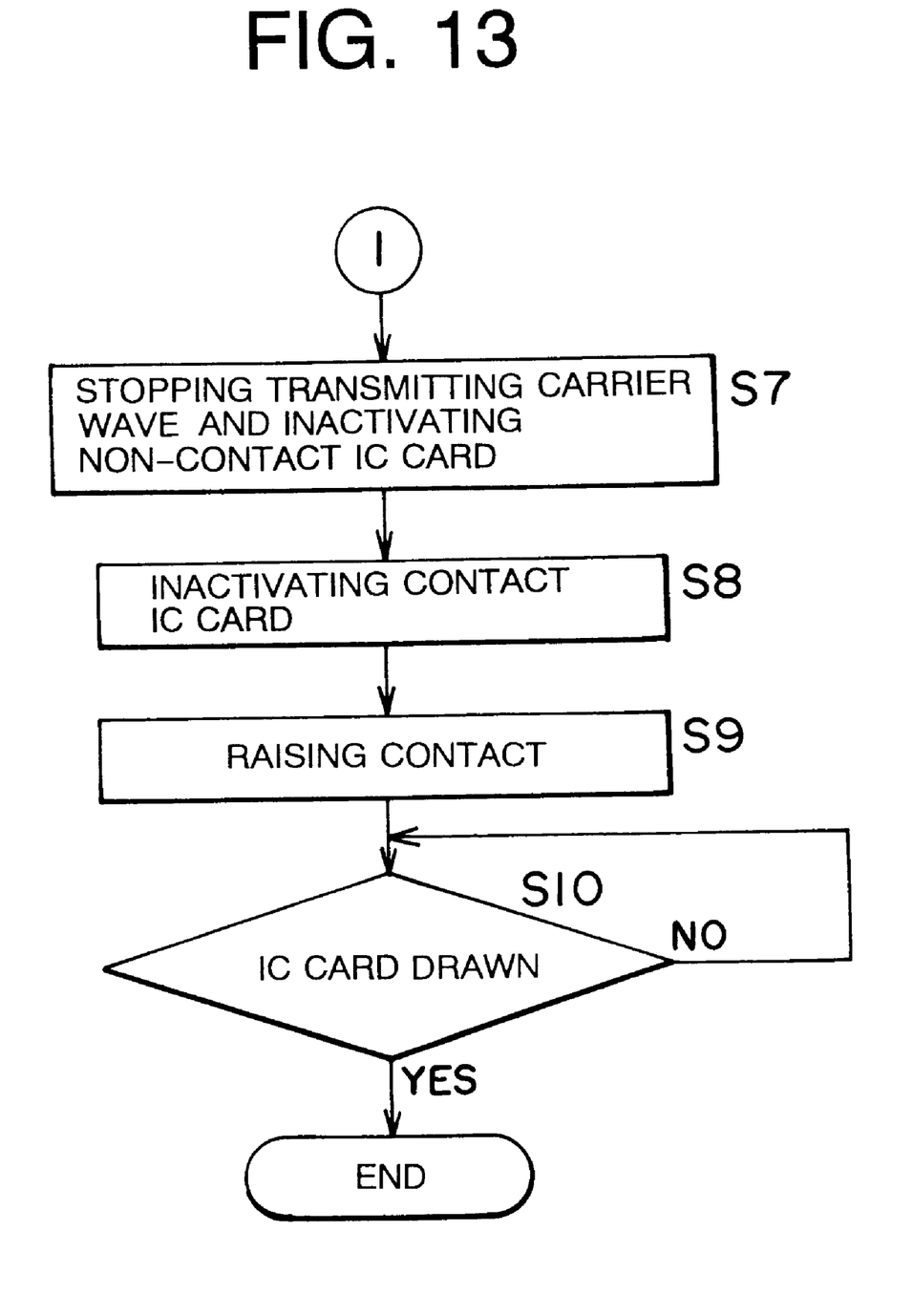
FIG. 13 is a second flow chart showing the operation of the contact/non-contact IC card reader-writer according to the second embodiment of the present invention.

FIG. 12 is a first flow chart showing the operation of the contact/non-contact IC card reader-writer according to the second embodiment of the present invention. FIG. 13 is a second flow chart showing the operation of the contact/non-contact IC card reader-writer according to the second embodiment of the present invention.

First, the main controller 61 in the contact/non-contact IC card reader-writer 71 (see FIG. 10) waits for the IC card 60 to be inserted into the IC card insertion port 66, and when the IC card 60 is inserted into the IC card insertion port 66, on the assumption the inserted IC card 60 is the non-contact IC card 30 (see FIG. 4), the wireless part 65 starts to transmit a carrier wave and an effort is made to activate the IC card 60 in accordance with the activation process specified in the ISO 7816-3. Then, the main controller 61, on the assumption that the inserted IC card 60 is the contact IC card 10 (see FIG. 2) or the contact/non-contact IC card 50 (see FIG. 1), operates the actuator 69 to lower the contact 64 into mechanical and electrical contact with the contact of the IC card 60, and an effort is made to activate the IC card 60 by the activation process specified in the ISO 7816-3.

Successively, the main controller 61 judges whether the response data from the IC card 60 (contact IC card 10, non-contact IC card 30 or contact/non-contact IC card 50) is received or not, and when the response data is received, the main controller 61 judges that the inserted IC card 60 is one of the contact IC card 10, the non-contact IC card 30 and the contact/non-contact IC card 50, but does not determine which one of the three types of IC cards the inserted IC card 60 is.

Then, the main controller 61 in the contact/non-contact IC card reader-writer 71 performs the access process to the IC card 60 specified in the ISO 7816-3 and in the ISO 7816-4.

When the process of accessing the inserted IC card 60 is finished in this way, the contact/non-contact IC card reader-writer 71, on the assumption that the inserted IC card 60 is the non-contact IC card 30, stops transmitting the carrier wave from the wireless part 65 and deactivates the inserted IC card 60.

Then, the contact/non-contact IC card reader-writer 71, on the assumption that the inserted IC card 60 is the contact IC card 10 or the contact/non-contact IC card 50, deactivates the inserted IC card 60 through the contact 64, operates the actuator 69 so as to raise the contact 64 and separates the contact 64 and the IC card 60 mechanically.

Thereafter, the contact/non-contact IC card reader writer 71 waits for the inserted IC card 60 to be drawn out, and when the IC card 60 is drawn out, the processes are finished.

Additionally, when the contact/non-contact IC card reader-writer 71 receives no answer to reset data, from the IC card 60, the transmission of the carrier wave is stopped immediately, In this case, the IC card 60 inserted into the contact/non-contact IC card reader-writer 71 is neither the contact IC card 10, the non-contact IC card 30 nor the contact/non-contact IC card 50.

As above-described, with contact/non-contact IC card reader-writer 71, data can be read from and written in the contact IC card 10, the non-contact IC card 30 and the contact/non-contact IC card 50.

Thus, it is not necessary to provide both of the contact IC card reader -writer 17 (see FIG. 3) and the non-contact IC card reader-writer 40 (see FIG. 5), and the cost can be reduced.

Next, in FIG. 12, an explanation will be given of the flow charts.

Step S1: Waiting for an IC card 60 to be inserted;

Step S2: On the assumption the IC card 60 is the non-contact card 30, starting to transmit the carrier wave from the wireless part 65 and trying to activate the IC card 60;

Step S3: On the assumption that the IC card 60 is the contact card 10 or the contact/non-contact IC card 50, lowering the contact 64 so as to connect the contact 64 and the contact of the IC card 60 mechanically;

Step S4: Trying to activate the IC card 60;

Step S5: Judging whether the answer to reset data from the IC card 60 is received or not, and going to Step S6 when the answer to reset data is received and going to Step S7 when no response data is received;

Step S6: Performing the process of accessing the IC card 60 with the access process unit;

Step S7: On the assumption that the IC card 60 is the non-contact IC card 30, stopping the transmitting of the carrier wave to deactivate the IC card 60;

Step S8: On the assumption that the IC card 60 is the contact IC card 10 or the contact/non-contact IC card 50, deactivating the IC card 60;

Step S9: Operating the actuator 69 so as to raise the contact 64, and separating the contact 64 and the IC card 60 mechanically/electrically; and Step S10: Waiting for the IC card 60 to be drawnout.

Now, according to the second embodiment, when the IC card 60 is inserted into the IC card insertion port 66, not only is the carrier wave transmitted to the IC card 60 on the assumption that the IC card 60 is the non-contact IC card 30, but also the contact 64 and the contact of the IC card 60 are connected mechanically on the assumption that the IC card 60 is the contact IC card 10 or the contact/non-contact IC card 50.

Thus, even though the IC card 60 may be the non-contact IC card 30, the contact 64 tries to connect with the non-contact IC card 30 mechanically, so that there is a possibility that the surface to the non-contact IC card 30 is damaged.

Therefore, an explanation will be given of the third embodiment, in which there is no possibility that the surface of the non-contact IC card 30 is damaged when the IC card 60 is the non-contact IC card 30.

Figure 14:
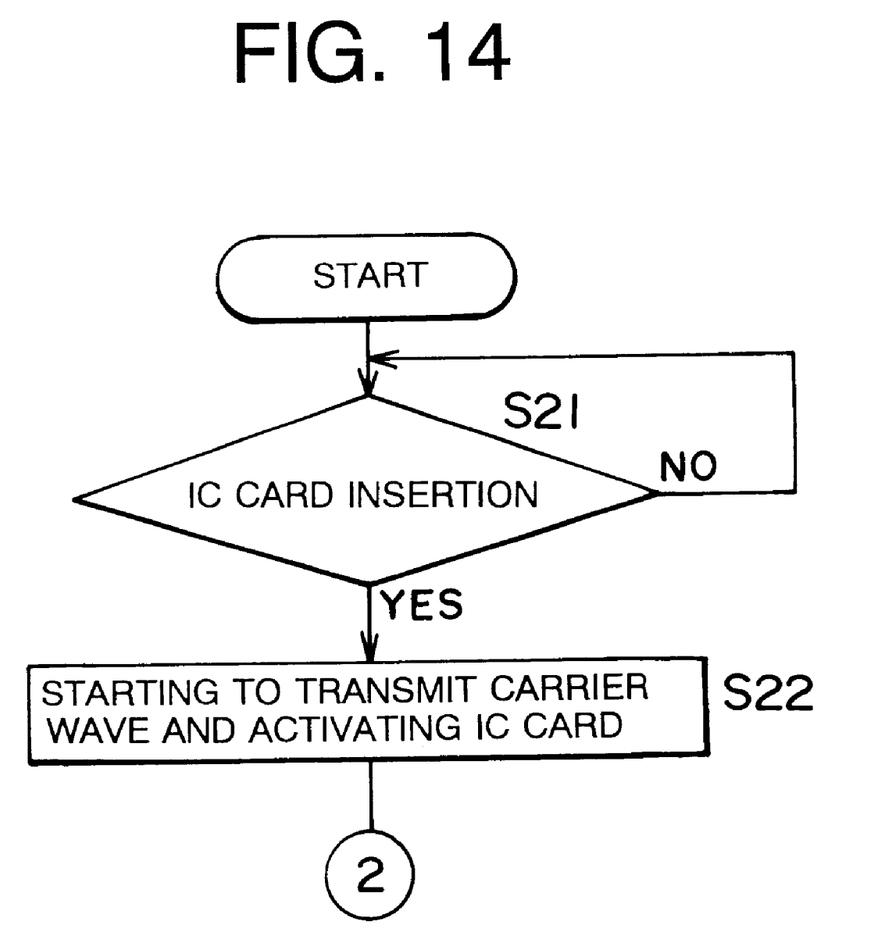
FIG. 14 is a first flow chart showing the operation of the contact/non-contact IC card reader-writer according to the third embodiment of the present invention.

FIG. 14 is a first flow chart showing the operation of the contact/non-contact IC card reader-writer according to the third embodiment of the present invention.

Figure 15:
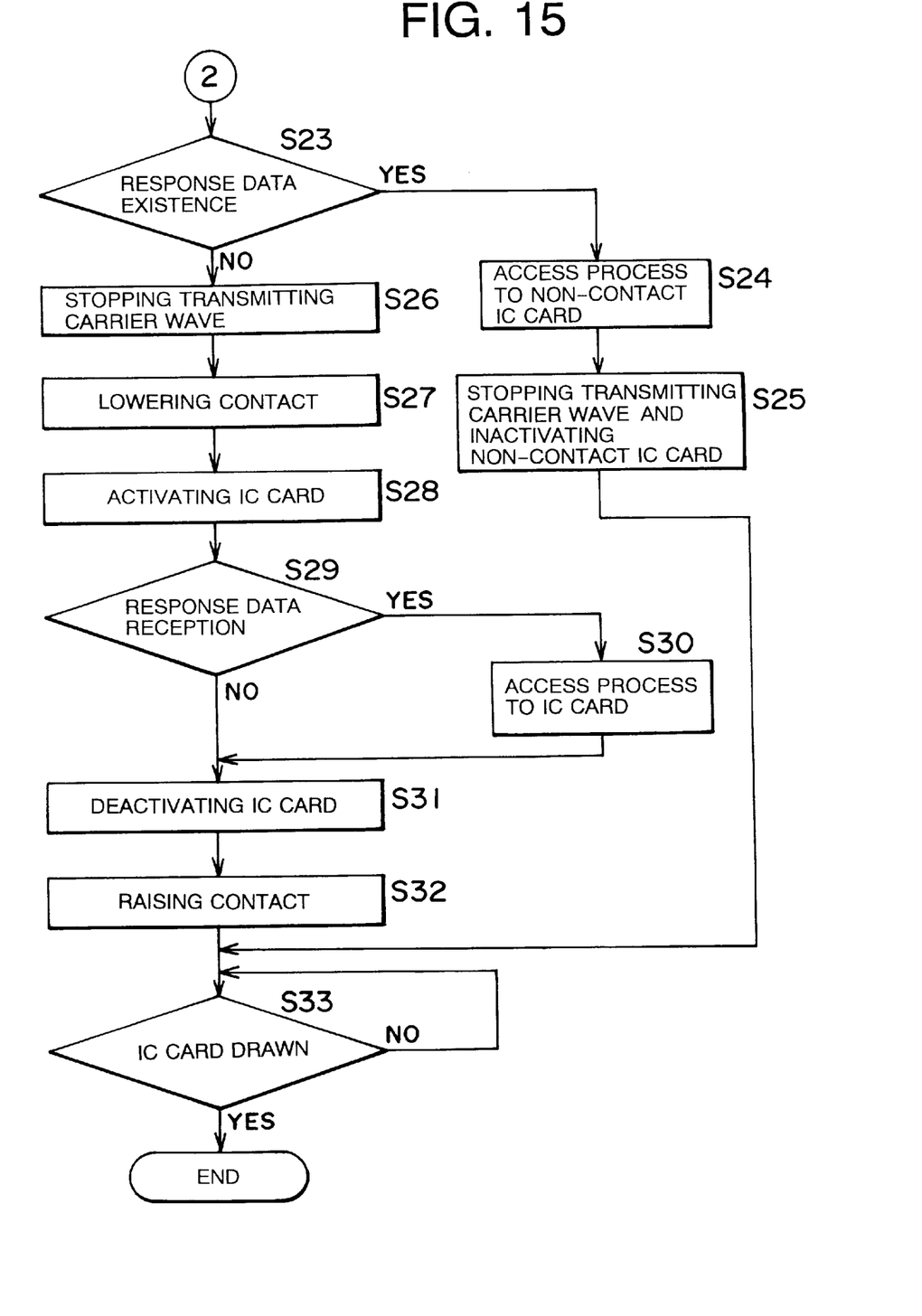
FIG. 15 is a second flow chart showing the operation of the contact/non-contact IC card reader-writer according to the third embodiment of the present invention.

FIG. 15 is a second flow chart showing the operation of the contact/non-contact IC card reader-writer according to the third embodiment of the present invention.

First, the contact/non-contact IC card reader-writer 71 (see FIG. 10) waits for the IC card 60 to be inserted into the IC card insertion port 66, and when the IC card 60 is inserted into the IC card insertion port 66, on the assumption that the inserted IC card 60 is the non-contact IC card 30 (see FIG. 4), starts to transmit the carrier wave from the wireless part 65 and tries to activate the IC card 60 with the main controller 61.

Successively, the main controller 61, when the answer to reset data is received in accordance with the activation of the IC card 60, judges that the inserted IC card 60 is the non-contact IC card 30. Then, the access process unit (not shown) in the contact/non-contact IC card reader-writer 71 accesses the non-contact IC card 30 according to the process specified in the ISO 7816-3 and the ISO 7816-4.

When the access process is finished in this way, the contact/non-contact IC card reader-writer 71 stops transmitting the carrier wave from the wireless part 65 to the non-contact IC card 30 and deactivates the non-contact IC card 30.

Then, the contact/non-contact IC card reader-writer 71 waits for the inserted IC card 60 to be drawn out, and the processes are finished when the IC card 60 is drawn out.

Further, when no answer is received from the IC card 60 to reset data, the contact/non-contact IC card reader-writer 71 stops transmitting the carrier wave from the wireless part 65 to the IC card 60. Then, the main controller, on the assumption that the IC card 60 is the contact IC card 10 (see FIG. 2) or the contact/non-contact IC card 50 (see FIG. 1), lowers the contact 64 so as to connect the contact 64 and the contact of the IC card 60 mechanically and tries to activate the IC card 60.

Then, the main controller 61 judges whether the answer to reset data is received or not in accordance with the activation of the IC card 60, and when the answer to reset data is received, the main controller 61 judges that the inserted IC card 60 is the contact IC card 10 or the contact/non-contact IC card 50. Then, the main controller 61 in the contact/non-contact IC card reader-writer 71 accesses the IC card 60.

When the process of accessing the IC card 60 is finished in this way, the contact/non-contact IC card reader-writer 71 deactivates the IC card 60, operates the actuator 69 so as to raise the contact 64 and separates the contact 64 and the contact of the IC card mechanically.

Then, the contact/non-contact IC card reader-writer 71 waits as the inserted IC card 60 is drawn out, and the processes are finished when the IC card 60 is drawn out.

Moreover, when the answer to reset data is transmitted from neither the contact IC card 10 nor the contact/non-contact IC card 50, the contact/non-contact IC card reader-writer 71 deactivates the IC card 60 and raises the contact 64 so as to separate the contact 64 and the contact of the IC card 60 mechanically. In this case, the IC card 60 inserted into the contact/non-contact IC card reader-writer 71 is neither the contact IC card 10, the non-contact IC card 30 nor the contact/non-contact IC card 50.

As above described, first, it is judged whether the inserted IC card 60 is the non-contact IC card 30 or not, and only when the IC card 60 is not the non-contact IC card 30, it is judged that the IC card 60 is the contact IC card 10 or the contact/non contact IC card 50. Therefore, the contact 64 does not try to connect with the non-contact IC card 30 mechanically.

Thus, there is no possibility that the surface of the non-contact IC card 30 is damaged.

Next, and explanation will be given of the flow charts of FIGS. 14 and 15.

Step S21: Waiting for the IC card 60 to be inserted;

Step S22: Starting to transmit the carrier wave from the wireless part 65 and trying to activate the IC card 60;

Step S23: Judging whether the IC card 60 is the non-contact IC card 30 by judging whether the answer to reset data is received or not, and going to Step S24 when the answer to reset data is received, and going to Step 26 when no answer to reset data is received;

Step S24: Accessing the non-contact IC card 30 with the main controller 61;

Step S25: Stopping the transmission of the carrier wave from the wireless part 65 so as to deactivate the non-contact IC card 30 and going to Step S33;

Step S26: Stopping the transmission of the carrier wave;

Step S27: On the assumption that the IC card 60 is the contact IC card 10 or the contact/non-contact IC card 50, operating the actuator 69 so as to lower the contact 64 to connect the contact 64 and the contact of the IC card 60 mechanically;

Step S28: Trying to activate the IC card 60;

Step S29: Judging whether the IC card 60 is the contact IC card 10 or the contact/non-contact IC card 50 by judging whether the answer to reset data is received or not from the IC card 60 and going to Step S30 when the answer to reset data is received, and going to Step 31 when no answer to reset data is received;

Step S30: Accessing the IC card 60 with the access process unit;

Step S31: Deactivating the IC card 60;

Step S32: Raising the contact 64 so as to separate the contact 64 and the contact of the IC card 60 mechanically; and Step S33: Waiting for the IC card 60 to be withdrawn.

What is claimed is:

1. An IC card comprising:
   a contact for connecting to a contact IC card reader-writer, data communication between the IC card and the contact IC card reader-writer being transmitted through the contact;
   a wireless part for performing data communication with a non-contact IC card reader-writer;
   a modem for modulating data transmitted to and demodulating data received from a non-contact IC card reader-writer;
   a controller for controlling the data communication;
   a detector for detecting that the IC card is inserted into a contact IC card reader-writer and for detecting that the IC card is inserted into a non-contact IC card reader-writer; and
   a selector for connecting the controller to the contact when the detector detects a contact IC card reader-writer and connecting the controller to the modem when the detector detects a non-contact reader-writer.

2. An IC card according to claim 1, further comprising:
   a rectifier for rectifying a supply voltage received from a non-contact IC card reader-writer to produce a predetermined driving voltage for the IC card.

3. An IC card according to claim 2, wherein the selector connects the modem with the controller when the detector does not detect a supply voltage, and connects the contact with the controller when the detector detects a supply voltage.

4. An IC card according to claim 1, wherein the detector is connected with the contact and the detector detects a supply voltage supplied from a contact IC card reader-writer.

5. An IC card reader-writer comprising:
   a contact for connecting to a contact IC card inserted in the reader-writer, data communication between the inserted contact IC card and the IC card reader-writer being transmitted through the contact;
   a transceiver for performing data communication with a non-contact IC card inserted in the reader-writer;
   a modem for modulating data transmitted to and demodulating data received from an inserted non-contact IC card; and
   a controller for controlling the data communication;
   wherein the controller judges if an inserted IC card is a contact IC card and if the inserted IC card is a non-contact IC card, and, based on a judged result, accesses the inserted IC card if the inserted IC card is judged to be a contact IC card or a non-contact IC card.

6. An IC card reader-writer according to claim 5, further comprising:
   voltage supply means for supplying a supply voltage to the inserted IC card if the inserted IC card is a contact IC card.

7. An IC card reader-writer according to claim 5, wherein the controller judges whether the inserted IC card is a contact IC card or a non-contact IC card, based on an answer to reset data, transmitted from the inserted card.

8. An card reader-writer according to claim 5, wherein the controller transmits a carrier wave to the inserted IC card and judges whether the inserted IC card is a non-contact IC card, based on an answer to the reset data transmitted from the inserted IC card, and thereafter, the controller connects the contact of the IC card reader-writer with the inserted IC card when the inserted IC card is not a non-contact IC card and judges whether the inserted IC card is a contact IC card based on the answer to reset data transmitted from the inserted IC card.

9. An IC card comprising:
   a contact for connecting to a contact IC card reader-writer, data communication between the IC card and the contact IC card reader-writer being transmitted through the contact;

a transceiver for transmitting data to and receiving data from a non-contact IC card reader-writer;

a modem for modulating data transmitted to and demodulating data received from a non-contact IC card reader-writer;

a controller for controlling data communications;

a detector for detecting that the IC card is inserted into a contact IC card reader-writer by detecting a supply voltage on the contact; and a selector for connecting the controller to the contact when the detector detects a the supply voltage from a contact IC card reader-writer into which the IC card is inserted, and connecting the controller to the modem when the detector does not detect a supply voltage from a contact IC card reader-writer into which the IC card has been inserted.

* * * * *